March 13, 1956 N. TESAURO 2,737,847
MAGNETIC BI-FOCAL LENS HOLDER
Filed Oct. 20, 1952

INVENTOR.
Nicholas Tesauro
BY
Att'y

United States Patent Office 2,737,847
Patented Mar. 13, 1956

2,737,847

MAGNETIC BI-FOCAL LENS HOLDER

Nicholas Tesauro, San Francisco, Calif.

Application October 20, 1952, Serial No. 315,638

1 Claim. (Cl. 88—41)

This invention relates to improvements in bifocals and has particular reference to magnetic means for holding and storing of the plus portion of the lens.

The principal object of this invention is to provide a pair of glasses wherein the user may have the advantage of using them either as an ordinary eye glass, or as bifocals, by the mere addition of a movable plus lens which may be readily placed in front of the ordinary lens.

A further object is to provide a movable lens which may be positioned in any desired place as for reading purposes, and can thereafter be removed and placed in a storage pocket in the eye glass frame and be held in storage position through the same means that holds the lens in reading position.

Other objects and advantages will be apparent during the course of the following description.

In the accompanying drawings forming a part of this specification and in which like numbers are employed to designate like parts throughout the same, Fig. 1 is a perspective view of a pair of lens eye glass frames having my invention applied thereto;

Figures 1, 2, 3, 4:
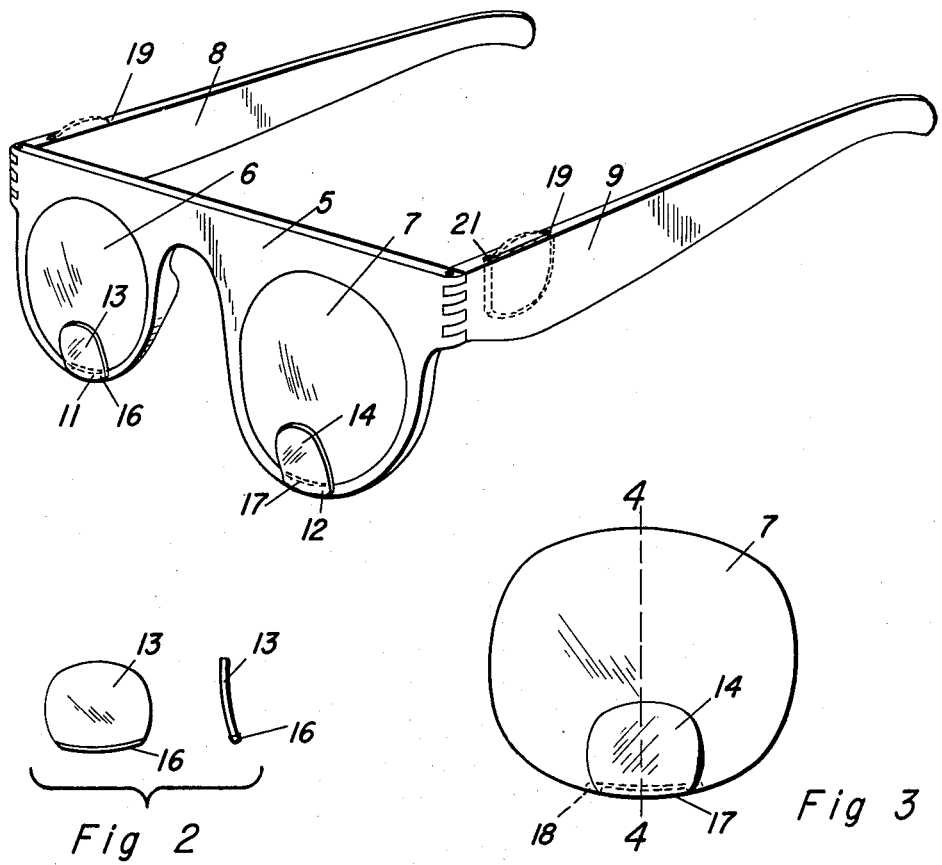
Fig. 2 is a front and side elevation of a so-called bifocal or plus lens.
Fig. 3 is a front elevation of an ordinary eye glass lens having my plus lens removably secured thereto and showing a modified form of attachment.
Fig. 4 is an enlarged cross sectional view taken on the line 4—4 of Fig. 3.

Many persons, due to eye difficulties, have to use different types of glasses for distant viewing of objects or for near viewing of objects. Some wearers of glasses have their glasses so constructed that a certain area in each of the lens has a plus refraction added thereto, which type of glasses are known as bifocals. These glasses are expensive to manufacture and when broken are costly to repair.

Also, many people object to the use of bifocals for the reason that particularly in stronger glasses the added bifocal portion of the glass may at times result in confusion in the vision, stumbling or falling. It is therefore apparent that by providing a removable bifocal or plus portion that this trouble may be easily removed.

Referring to the drawings, wherein for the purpose of illustration is shown a preferred embodiment of my invention, the numeral 5 designates the frame into which the customary lenses 6 and 7 of eye glasses are mounted.

In order to hold this frame on the face, temples 8 and 9 are hingedly attached to the frame 5, which temples parallel the sides of the face and also in some instances partially encircle the backs of the ears.

The construction thus far described is common to eye glasses in general.

My invention consists in securing adjacent the bottom of the lenses 6 and 7 as shown at 11 and 12 metal pieces which are attractive to magnetic force.

At 13 and 14 I have shown plus lenses, each of which has mounted along its lower edge as shown at 16 and 17 small magnetic strips through the medium of which the lenses 13 and 14 may be held against the lenses 6 and 7 respectively through the attraction of the magnets 16 and 17 to the metal strips 11 and 12.

In the modified form shown in Figs. 3 and 4, I have formed a small cavity in the bottom of the lens as shown at 18 in which is positioned a metal strip which is attractive to a magnetic force so that when the lens 14 and its magnet 17 are placed thereagainst, the attraction of the two will be sufficient to hold the plus lens to the regular lens. In each of the temples I have formed a pocket 19 so that the lenses 13 and 14 when not in use may be placed therein as shown in dotted lines in Fig. 1 and I have positioned adjacent one edge of the pocket magnetic metal 21 to which the magnet on the plus lenses will be attracted. Therefore, when the plus lenses are placed in the pockets 19, they will be retained therein against accidental dropping and at that time, the glasses may be used in the customary manner.

It is to be understood that the form of my invention herewith shown and described is to be taken as a preferred example of the same and that various changes relative to the material, size, shape, and arrangement of parts may be resorted to without departing from the spirit of the invention or the scope of the subjoined claim.

Having thus described my invention, I claim:

Means for selectively positioning supplemental lenses in operative and inoperative positions on spectacles including a frame having a pair of lenses supported thereby and temples pivotally secured to said frame, and wherein each of said supplemental lenses is provided with a magnetic piece adjacent an edge thereof; which comprises a magnetically attractive piece secured to each of said pair of lenses adjacent the lower edge thereof and on the vertical center line thereof for removably holding a supplemental lens on one or both of said spectacle lenses through the force of magnetic attraction, and said temples each being provided with a vertically disposed pocket opening through the upper edge thereof and being of a width substantially equal to the thickness of said supplemental lenses, and being of a depth for substantially concealing said lenses when disposed therein, and a magnetic piece disposed along an edge of each pocket for attracting the magnetically attractive metal piece on a supplemental lens disposed therein.

References Cited in the file of this patent

UNITED STATES PATENTS

| 648,165 | Falardeau | Apr. 24, 1900 |
| 1,395,625 | Zimmerman | Nov. 1, 1921 |
| 2,147,482 | Butler | Feb. 14, 1939 |
| 2,217,475 | Goehring, Sr. | Oct. 8, 1940 |
| 2,598,272 | Krimsky | May 27, 1952 |
| 2,613,104 | Parsons | Oct. 7, 1952 |

FOREIGN PATENTS

| 915,421 | France | July 22, 1946 |

OTHER REFERENCES

The Optician, "Dual Sight Spectacle," vol. 113, Issue No. 3185, page 11, April 18, 1952.